UNITED STATES PATENT OFFICE.

WULFF SERGIUS NORMELLI AND REIDAR BLOM, OF RJUKAN, NORWAY, ASSIGNORS TO NORSK HYDRO-ELEKTRISK KVAELSTOFAKTIESELSKAB, OF CHRISTIANIA, NORWAY.

PROCESS FOR THE RECOVERY OF ALKALINE CARBONATES FROM ALKALINE NITRATES AND SIMULTANEOUSLY PRODUCING NITRATES OF AMMONIA.

1,202,883.     Specification of Letters Patent.     Patented Oct. 31, 1916.

No Drawing.     Application filed June 14, 1915. Serial No. 34,055.

*To all whom it may concern:*

Be it known that we, WULFF SERGIUS NORMELLI, a subject of the King of Sweden, residing at Rjukan, Norway, and REIDAR BLOM, a subject of the King of Norway, residing at Rjukan, Norway, have invented certain new and useful Improvements in Processes for the Recovery of Alkaline Carbonates from Alkaline Nitrates and Simultaneously Producing Nitrates of Ammonia; and we do hereby declare the following to be a full, clear, and exact description of the invention, such as will enable others skilled in the art to which it appertains to make and use the same.

This invention relates to the utilization of nitrous gases by absorbing the same in solutions of alkaline compounds and has for its object a process for the recovery of the absorbent from the alkaline compounds produced by the said absorption process and also producing nitrate of ammonia.

By the absorption of nitrous gases in alkalis one obtains substantially nitrites. The consumption of nitrites is however quite limited, so that the production by far exceeds the demand. Large quantities of nitrite have from this reason been transformed into nitrate and sold as such. Owing to the fact that this nitrate has usually been produced from comparatively expensive soda the profits obtained by the sale of such nitrate will be quite small, and from this reason there has been sought methods by which a recovery of the alkaline carbonate could be carried out profitably so that the recovered alkaline carbonate could be repeatedly employed for the absorption of nitrous gases.

The object of the present invention is to recover the alkali in the form of a bicarbonate or carbonate by the combination of several reactions to a cyclic process by which nitrate of ammonia results as a final product while only nitrous gases, ammonia and carbonic acid are consumed in the process.

When soda is employed as an absorbent for the nitrous gases the process may be carried out in the following manner. The nitrite or nitrite-nitrate obtained by the absorption of nitrous gases in soda is transformed into nitrate by means of nitric acid in a known manner. To the nitrate solution obtained hereby is then added the necessary quantity of chlorid of ammonia, whereupon the solution is boiled down. Chlorid of sodium is hereby separated as the salt having the lowest degree of solubility. During the evaporation while chlorid of sodium is separated out further quantities of nitrate of sodium and chlorid of ammonium may be added until the desired degree of concentration of the nitrate of ammonia in the solution is reached. The resulting concentrated solution of nitrate of ammonia contains however also small quantities of chlorid of sodium, nitrate of sodium and chlorid of ammonia. When the concentrated solution is cooled down a nitrate of ammonia containing the above named impurities will therefore be separated out. Now it is however of the greatest importance to produce a pure nitrate of ammonia because only such a pure substance could be used in the manufacturing of explosives, where the largest quantities of nitrate of ammonia are consumed.

It has now been found by experiments that it is an easy task to produce pure nitrate of ammonia from the above named concentrated solution when there is added to the solution so much water, that all of the salts present in a lower degree of concentration than the nitrate of ammonia are maintained in solution of the temperature, at which the nitrate of ammonia is crystallized out. The crystallized nitrate of ammonia is separated from the mother lye in the usual manner, whereupon the salt is brought into a pure condition by washing the same with a pure solution of the salt.

The chlorid of sodium, which is separated out during the boiling is reacted upon with ammonia and carbonic acid to produce bicarbonate of sodium and chlorid of ammonia. The bicarbonate may if desired be transformed into carbonate and used again for the absorption of nitrous gases. It is preferable however to dissolve the bicarbonate directly in water and to employ the resulting solution for the absorption of the nitrous gases. In this manner it is made possible to absorb practically unlimited quantities of nitrous gases by means of a comparatively small quantity of soda or sodium bicarbonate which circulates in the process. The solution of chlorid of ammonia obtained by the reaction is directly employed for reacting with the nitrate obtained by the absorption.

To facilitate the understanding of the process reference may be had to the following diagram, which shows how the reactions take place and how the salts of sodium circulate in the process.

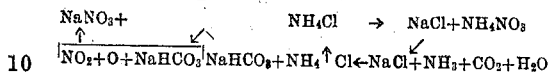

As will be seen from the above it is as mentioned theoretically considered possible to transform unlimited quantities of nitrous gases and ammonia into nitrate of ammonia by means of a certain quantity of bicarbonate. In actual manufacturing there will be unavoidable small losses of the absorbent with chlorid of sodium.

By means of this process the problem of recovering the absorbent for the nitrous gases is solved in a very rational manner. Previously experiments have been made to react upon nitrate of sodium with ammonia and carbonic acid to form bicarbonate of sodium but it is not possible according to this method to obtain pure nitrate of ammonia in a rational manner. Besides difficulties of a purely technical character difficulties arise from the reason that the conditions under which the reaction takes place are much more unfavorable especially because of the high concentrations of the salt solutions with which it is necessary to work and which make the reaction velocity so low that the efficiency of the apparatus employed is considerably reduced. The advantages of the present process over these prior processes consist therein, that the reaction is very complete owing to the low degree of solubility of the chlorid of sodium which makes it possible during the boiling operation to remove the greater part of the dissolved salt of sodium as chlorid of sodium so that pure nitrate of ammonia is directly obtained.

Claims:

1. The process for the recovery of alkali metal carbonates from alkali metal compounds obtained by the absorption of nitrous gases in solutions of alkali metal carbonates and also for producing nitrate of ammonia, which comprises transforming the nitrite content of the solution into nitrate, reacting upon the resulting nitrate with chlorid of ammonia to form nitrate of ammonia and an alkali metal chlorid which latter is then separated off and reacted upon with carbonate of ammonia to form a carbonate of the alkali metal for the absorption of fresh quantities of nitrous gases.

2. The process for the recovery of alkali metal carbonates from alkali metal compounds obtained by the absorption of nitrous gases in solutions of alkali metal carbonates and also for producing nitrate of ammonia, which comprises transforming the nitrite content of the solution into nitrate, reacting upon this nitrate with chlorid of ammonia to form nitrate of ammonia and chlorid of the alkali metal, separating out the said alkali metal chlorid while boiling the solution down, effecting the crystallization of the nitrate of ammonia by subsequently cooling the solution and reacting upon the alkali metal chlorid which has been separated off with carbonate of ammonia to form chlorid of ammonia to be returned in the cycle of operations, and a carbonate of the alkali metal for the absorption of fresh quantities of nitrous gases.

3. The process for the recovery of alkali metal carbonates from alkali metal compounds obtained by the absorption of nitrous gases in solutions of alkali metal carbonates and also for producing nitrate of ammonia, which comprises transforming the nitrite content of the solution into nitrate, reacting upon the resulting nitrate with chlorid of ammonia to form nitrate of ammonia and an alkali metal chlorid which latter chlorid is then separated off and reacted upon with carbonate of ammonia to form a carbonate of the alkali metal for the absorption of fresh quantities of nitrous gases while the solution from which the alkali metal chlorid has been separated off is further treated by adding to the same a sufficient quantity of water, and effecting the crystallization of the nitrate of ammonia by subsequently cooling the solution.

In testimony that we claim the foregoing as our invention, we have signed our names in presence of two subscribing witnesses.

WULFF SERGIUS NORMELLI.
REIDAR BLOM.

Witnesses:
R. E. GUTTORDESSEN,
C. FABRICIUS HANSEN.